United States Patent
Kwag et al.

(10) Patent No.: US 10,978,689 B2
(45) Date of Patent: Apr. 13, 2021

(54) BATTERY PACK

(71) Applicant: Samsung SDI Co., Ltd., Yongin-si (KR)

(72) Inventors: Nohyun Kwag, Yongin-si (KR); Jooyul Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 144 days.

(21) Appl. No.: 16/121,497

(22) Filed: Sep. 4, 2018

(65) Prior Publication Data

US 2019/0097203 A1  Mar. 28, 2019

(30) Foreign Application Priority Data

Sep. 22, 2017 (KR) .................. 10-2017-0122873

(51) Int. Cl.
  *H01M 2/20* (2006.01)
  *H01M 2/10* (2006.01)
  *H01M 2/12* (2006.01)

(52) U.S. Cl.
  CPC ........... *H01M 2/204* (2013.01); *H01M 2/105* (2013.01); *H01M 2/1077* (2013.01); *H01M 2/1241* (2013.01); *H01M 2/202* (2013.01)

(58) Field of Classification Search
  None
  See application file for complete search history.

(56) References Cited

U.S. PATENT DOCUMENTS

| | | | |
|---|---|---|---|
| 7,671,565 B2 | 3/2010 | Straubel et al. | |
| 7,923,144 B2 | 4/2011 | Kohn et al. | |
| 8,597,808 B2 | 12/2013 | Park et al. | |
| 9,627,663 B2 | 4/2017 | Kim | |
| 2011/0171515 A1* | 7/2011 | Itoi | H01M 2/105 429/159 |
| 2011/0293986 A1* | 12/2011 | Kozu | H01M 2/105 429/120 |

(Continued)

FOREIGN PATENT DOCUMENTS

| | | | | |
|---|---|---|---|---|
| JP | 2014197452 A | * | 10/2014 | ......... H01M 2/1077 |
| JP | 2015-002166 A | | 1/2015 | |
| JP | 5933344 B2 | | 6/2016 | |

(Continued)

OTHER PUBLICATIONS

Geshi et al., JP 2014-197452, Machine Translation (Year: 2014).*

*Primary Examiner* — Ula C Ruddock
*Assistant Examiner* — Anna Korovina
(74) *Attorney, Agent, or Firm* — Lewis Roca Rothgerber Christie LLP

(57) ABSTRACT

A battery pack includes: a plurality of battery cells, each comprising at least one cell vent; a connection plate extending over the plurality of battery cells and electrically connected to the plurality of battery cells; and a cover including a cover plate arranged over the connection plate and a barrier wall protruding from the cover plate towards the connection plate, and the barrier wall includes at least two round portions extending between two neighboring battery cells of the plurality of battery cells to individually surround the at least one cell vent of a battery cell of the neighboring battery cells, and a stripe portion extending across the cover plate and spaced from the round portion.

22 Claims, 10 Drawing Sheets

(56) References Cited

U.S. PATENT DOCUMENTS

2013/0202941 A1* 8/2013 Ono .................. H01H 69/02
429/121
2014/0255748 A1* 9/2014 Jan .................. H01M 2/202
429/120

FOREIGN PATENT DOCUMENTS

| KR | 10-1191660 B1 | 10/2012 |
| KR | 10-2014-0127743 A | 11/2014 |
| KR | 10-2015-0051518 A | 5/2015 |

* cited by examiner

BATTERY PACK

CROSS-REFERENCE TO RELATED APPLICATION

This application claims priority to and the benefit of Korean Patent Application No. 10-2017-0122873, filed on Sep. 22, 2017 in the Korean Intellectual Property Office, the entire disclosure of which is incorporated herein by reference.

BACKGROUND

1. Field

Aspects of one or more embodiments relate to a battery pack.

2. Description of the Related Art

In general, a secondary battery is rechargeable and dischargeable, unlike a primary battery that may not be rechargeable. A secondary battery may be used as an energy source in mobile devices, electric vehicles, hybrid vehicles, electric bicycles, and uninterruptible power supplies, for example, in a type of a single battery or in a battery module, in which a plurality of batteries are electrically connected as a single unit, according to kinds of external devices to which the secondary battery is applied.

A small-sized mobile device, such as a mobile phone, may be operable with an output and a capacity of a single battery, but electric vehicles or hybrid vehicles consume a lot of electric power to drive for a long time with a high electric power and, thus, may use a module type including a plurality of batteries. In addition, an output voltage or an output current may increase according to the number of batteries included in the module.

SUMMARY

According to an aspect of one or more embodiments, a battery pack is capable of preventing or substantially preventing successive thermal runaways caused when flame and gas of high temperature and high pressure discharged from one battery cell are diffused to other battery cells according to a vent operation, and capable of safely and rapidly discharging the flame and gas of high temperature and high pressure along a designed exhaust path.

Additional aspects will be set forth, in part, in the description which follows and, in part, will be apparent from the description, or may be learned by practice of the presented embodiments.

According to one or more embodiments, a battery pack includes: a plurality of battery cells, each including at least one cell vent; a connection plate extending over the plurality of battery cells and electrically connected to the plurality of battery cells; and a cover including a cover plate arranged over the connection plate and a barrier wall protruding from the cover plate towards the connection plate, wherein the barrier wall includes at least two round portions extending between two neighboring battery cells of the plurality of battery cells to individually at least partially surround the at least one cell vent of a battery cell of the neighboring battery cells, and a stripe portion extending across the cover plate and spaced from the round portions.

Each of the round portions may be concave towards the at least one cell vent.

The round portions of the barrier wall may include a pair of round portions to at least partially surround the at least one cell vent.

An opening may be located between the pair of round portions.

The stripe portion may face the opening.

The stripe portion may include a pair of stripe portions extending at opposite sides of a column in which battery cells of the plurality of battery cells are arranged.

The stripe portion may extend to an exhaust hole located at an end portion of the cover.

The exhaust hole may include a pair of exhaust holes respectively located at an end portion of the stripe portion and an opposite end portion of the stripe portion.

A pair of round portions from among the round portions of the barrier wall at least partially surrounding each of the at least one cell vent may be arranged facing each other in a first axis, and a pair of the stripe portions may be arranged along a second axis that is perpendicular to the first axis.

The round portion and the stripe portion may be arranged at a same level in a vertical direction.

The round portion and the stripe portion may protrude from the cover plate to a depth abutting on the connection plate.

A vent hole may be located in a region of the cover plate, wherein the region is at least partially surrounded by a pair of round portions from among the round portions of the barrier wall.

The vent hole may include a plurality of vent holes arranged along a circumference of the pair of round portions.

A fracture portion may be located between the plurality of vent holes.

The fracture portion may include a thin wall portion having a thickness that is smaller than a thickness of a remaining region in the cover plate.

The connection plate may include: a first conductive plate and a second conductive plate configured to be electrically connected to the battery cells, the first and second conductive plate being stacked with each other in a vertical direction; and an insulation plate between the first and second conductive plates.

The battery pack may further include a first conductor and a second conductor configured to electrically connect a battery cell of the plurality of battery cells to the first and second conductive plates, respectively, wherein the first conductor may be configured to extend from an upper end of the battery cell and to be connected to a first coupling portion of the first conductive plate after penetrating through a first connection hole provided in the first conductive plate, and the second conductor may be configured to extend from the upper end of the battery cell and to be connected to a second coupling portion of the second conductive plate after penetrating through each of the first connection hole in the first conductive plate, a second connection hole in the second conductive plate, and a third connection hole in the insulation plate.

The first coupling portion connected to the first conductor may be adjacent to the first connection hole of the first conductive plate and stepped downward from a main surface of the first conductive plate, and the second coupling portion connected to the second conductor may be adjacent to the second connection hole of the second conductive plate and stepped downward from a main surface of the second conductive plate.

The first coupling portion may be provided at a location not facing the at least one cell vent along a circumference of the first connection hole in the first conductive plate.

The at least one cell vent may include a plurality of cell vents arranged circumferentially to at least partially surround a first electrode of the battery cell, and the first coupling portion may face a region between the plurality of cell vents.

The first conductor may include a first conductive wire or tab, and the second conductor may include a second conductive wire or tab.

Each of the battery cells may be cylindrical.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

Figure 1:
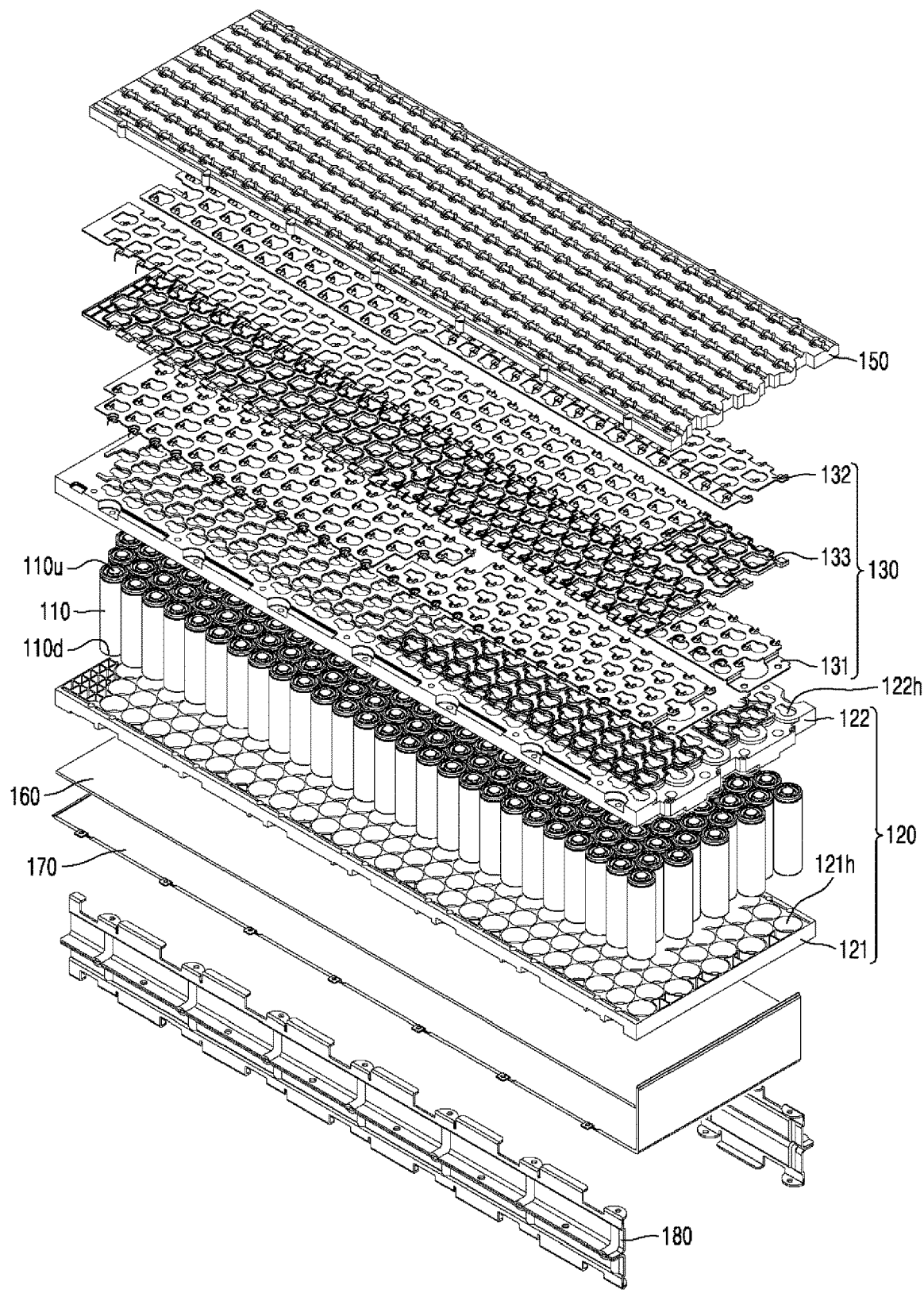
FIG. 1 is an exploded perspective view of a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Herein, a battery pack according to one or more embodiments will be described below with reference to the accompanying drawings.

Figure 2:
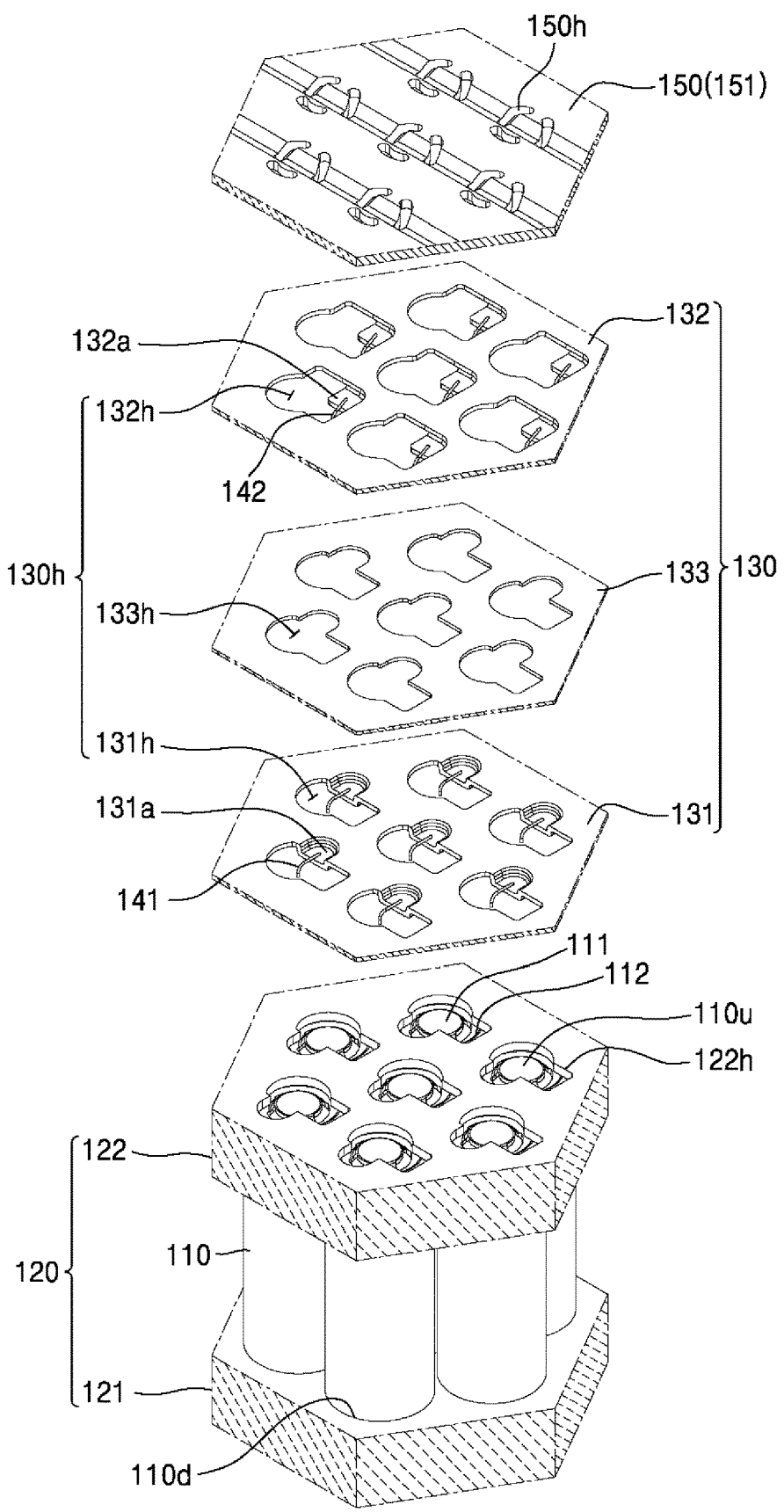
FIG. 2 is an exploded perspective view showing a portion extracted and expanded from the battery pack of FIG. 1.
Figure 3:
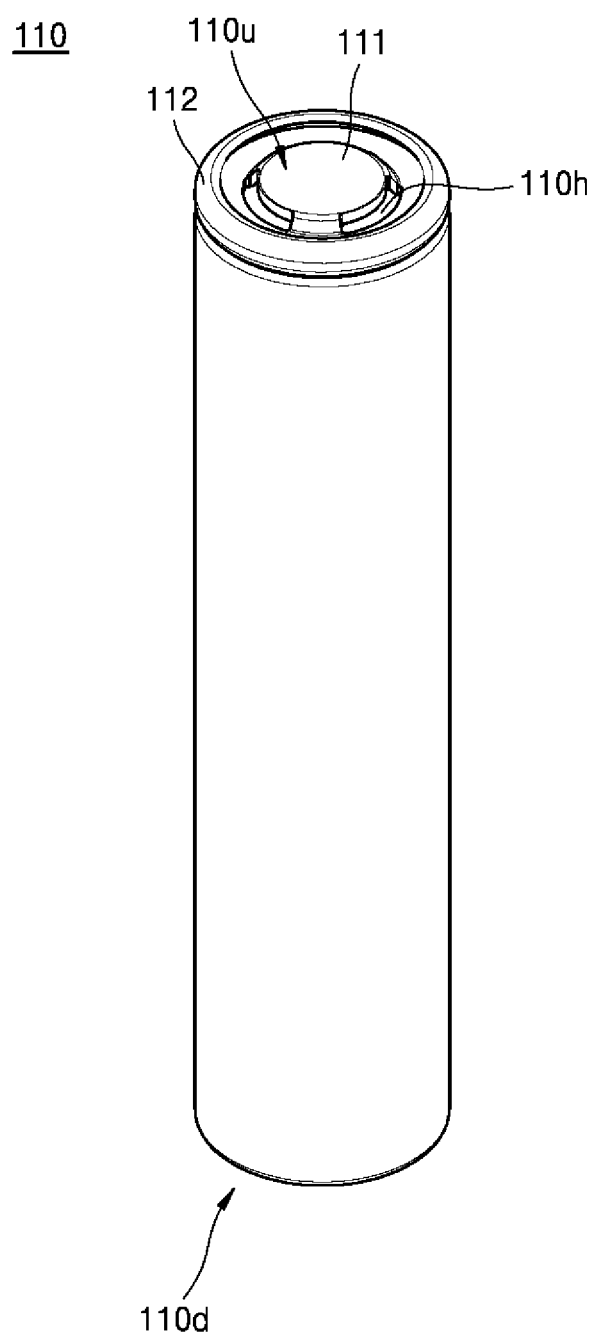
FIG. 3 is a perspective view of a battery cell of FIG. 1.
Figure 4:
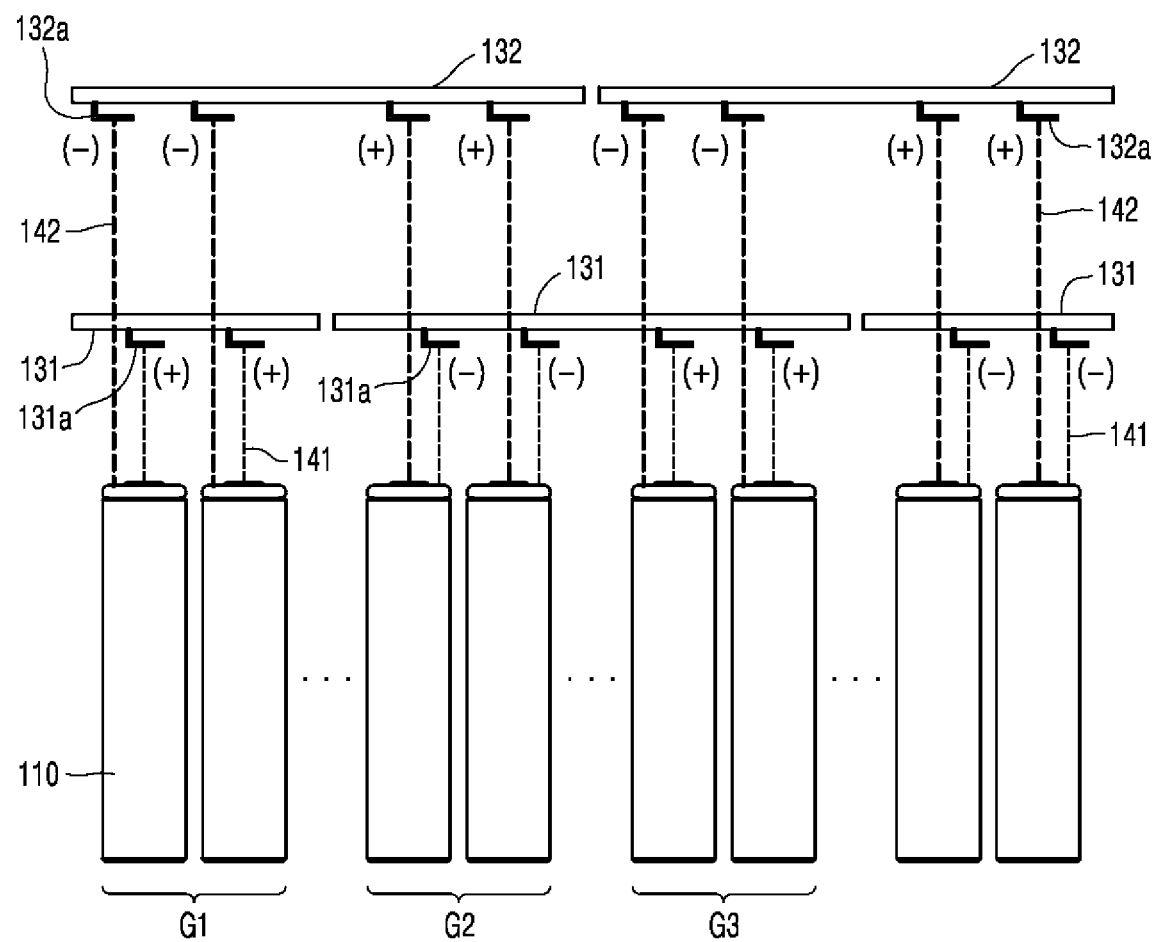
FIG. 4 is a diagram illustrating an electric connection of the battery cell of FIG. 1.

FIG. 1 is an exploded perspective view of a battery pack according to an embodiment. FIG. 2 is an exploded perspective view showing a portion extracted and expanded from the battery pack of FIG. 1. FIG. 3 is a perspective view of a battery cell of FIG. 1. FIG. 4 is a diagram illustrating an electric connection of the battery cell of FIG. 1.

Referring to FIGS. 1 and 2, the battery pack according to an embodiment includes a plurality of battery cells 110, a cell holder 120 for accommodating the battery cells 110, a connection plate 130 mounted on the cell holder 120 and including a first conductive plate 131 and a second conductive plate 132 electrically connected to the battery cells 110, and a cover 150 arranged on the connection plate 130.

The battery pack may include the plurality of battery cells 110, and, in an embodiment, may include a plurality of cylindrical batteries. For example, each of the battery cells 110 may include an upper end 110$u$ and a lower end 110$d$ along an axial direction (e.g., corresponding to a vertical direction), and a cylindrical surface between the upper end 110$u$ and the lower end 110$d$. However, the battery cell 110 of the present disclosure is not limited to the cylindrical battery cell 110, and may have any of various shapes, such as an oval shape, a polygonal shape, etc.

The battery cells 110 may be arranged to have parallel axial directions (e.g., the vertical direction) with one another and, for example, may be arranged as a matrix in a column direction and a row direction. In an embodiment, the cylindrical battery cells 110 may be arranged in a zigzag configuration, such that the battery cells 110 may be arranged in valleys defined between neighboring battery cells 110 in order to reduce dead space among the cylindrical battery cells 110.

The battery cells 110 may be supported by the cell holder 120, and may be arranged at accurate positions thereof due to the cell holder 120. For example, the cell holder 120 may include side walls for defining accurate positions of the battery cells 110, and each of the battery cells 110 may be assembled at the accurate position defined by the side walls of the cell holder 120. In addition, the plurality of battery cells 110 may be structurally connected with one another via the cell holder 120. In an embodiment, the cell holder 120 may include a first holder 121 and a second holder 122 that are respectively arranged on lower and upper portions of the battery cells 110. For example, the first holder 121 may cover the lower end 110$d$ of the battery cell 110, and the second holder 122 may cover the upper end 110$u$ of the battery cell 110.

In an embodiment, the second holder 122 may include a plurality of openings 122$h$, and the upper end 110$u$ of the battery cell 110 may be exposed through each of the openings 122$h$. A side wall surrounding the upper ends 110$u$ of the battery cells 110 may be provided around the openings 122$h$. As will be described later, first and second electrodes 111 and 112 having opposite polarities both may be provided on the upper end 110$u$ of the battery cell 110, and the openings 122$h$ corresponding respectively to the battery cells 110 are provided in the second holder 122 that covers the upper ends 110$u$ of the battery cells 110. Thus, the first and second electrodes 111 and 112 at the upper end 110$u$ of the battery cell 110 may be exposed through the opening 122$h$ of the second holder 122, and the first and second electrodes 111 and 112 of the battery cell 110 may be connected to paths of charging and discharging currents via the first and second conductive plates 131 and 132 on the second holder 122.

In the present disclosure, since the first and second electrodes 111 and 112 having different polarities may be both electrically connected through the upper end 110$u$ of the battery cell 110, additional openings 121$h$ (see FIG. 1) do not need to be provided in the first holder 121 at the lower end 110$d$ of the battery cell 110 for an electrical connection. However, in an embodiment, the additional openings 121$h$ (see FIG. 1) may be provided in the first holder 121$h$ for dissipating heat, not for electric connection, and the lower ends 110$d$ of the battery cells 110 may be exposed through each of the additional openings 121$h$.

In an embodiment of the present disclosure, in the axial direction (e.g., the vertical direction) of the battery cell 110, the electric connection may be performed via the upper end 110$u$ of the battery cell 110, and the heat dissipation may be performed via the lower end 110d of the battery cell 110. The connection plate 130 for electrically connecting to the battery cells 110 may be arranged at the side of the upper ends 110u of the battery cells 110, that is, on the second holder 122. In an embodiment, a cooling member 160 (see FIG. 1) may be arranged at the side of the lower ends 110d of the battery cells 110, that is, under the first holder 121. The cooling member 160 is thermally coupled to the side of the lower ends 110d of the battery cells 110, and, for example, the first holder 121 includes the openings 121h that may at least partially expose the lower ends 110d of the battery cells 110, and a side wall surrounding the lower ends 110d of the battery cells 110 may be provided around the openings 121h. That is, the first holder 121 includes the side wall surrounding the lower ends 110d of the battery cells 110 to define accurate positions of the battery cells 110, and a bottom of the first holder 121 surrounded by the side wall is at least partially open to form the openings 121h. In addition, thermal exchange with the cooling member 160 may be effectively performed via the openings 121h in the first holder 121.

The cooling member 160 may have any of various shapes provided that the heat dissipation from the battery cells 110 may be performed. For example, the cooling member 160 may be formed as a solid plate including a thermally conductive material or as a block type in which a flow path is provided to form a path of a cooling medium of a low temperature. In an embodiment, for example, the cooling member 160 may include an anodized aluminum plate.

The plurality of battery cells 110 included in the battery pack may be structurally connected with one another due to the cell holder 120 and may be electrically connected to one another via the connection plate 130. In an embodiment, the plurality of battery cells 110 connected by the cell holder 120 and the connection plate 130 are accommodated in a housing including a cover 150, a base 170, and side plates 180 between the cover 150 and the base 170 to be insulated from an external environment.

Referring to FIG. 3, in each of the battery cells 110, the first and second electrodes 111 and 112 having different polarities may be both provided at the upper end 110u of the upper end 110u and the lower end 110d of the battery cell 110 in the axial direction (e.g., the vertical direction). In order to prevent or substantially prevent an electrical short circuit between the first and second electrodes 111 and 112, the first and second electrodes 111 and 112 may be provided at different regions from each other on the upper end 110u of the battery cell 110. In an embodiment, for example, the first electrode 111 of the battery cell 110 is provided having a circular shape at a center region of the upper end 110u, and the second electrode 112 of the battery cell 110 may be provided having a loop or arc shape along a circumference of the upper end 110u to surround the first electrode 111.

Since the first and second electrodes 111 and 112 are both provided at the upper end 110u of the battery cell 110, the electric connection of the first and second electrodes 111 and 112 may be performed via the upper end 110u of the battery cell 110.

A cell vent 110h may be provided at the upper end 110u of the battery cell 110. In an embodiment, for example, the cell vent 110h may extend along a circumference of the first electrode 111 provided on the upper end 110u of the battery cell 110 and, in an embodiment, may include a plurality of cell vents 110h arranged on the circumference to surround (e.g., at least partially surround) the first electrode 111 and spaced apart from one another.

Referring to FIGS. 1 and 2, the connection plate 130 may be arranged on the upper ends 110u of the battery cells 110. The connection plate 130 may provide electrical charging and discharging paths of the plurality of battery cells 110, and may supply charging and discharging currents collected from the plurality of battery cells 110 to an external circuit (not shown). For example, the plurality of battery cells 110 included in the battery pack may be structurally connected with one another via the cell holder 120, and may be electrically connected with one another via the connection plate 130. For example, the connection plate 130 may connect the plurality of battery cells 110 with one another in series, in parallel, or in a combination thereof, and may provide wirings for connecting a group of battery cells 110 that are electrically connected with one another to the external circuit (not shown).

In an embodiment, the connection plate 130 may include the first conductive plate 131 connected to the first and second electrodes 111 and 112 of the battery cell 110, and the second conductive plate 132 connected to the first and second electrodes 111 and 112 of the battery cell 110, wherein the first and second conductive plates 131 and 132 are stacked with each other in a vertical direction and may have different polarities from each other.

The first conductive plate 131 and the second conductive plate 132 may electrically connect the plurality of battery cells 110 included in the battery pack with one another, and may connect the plurality of battery cells 110 in series, in parallel, or in a combination thereof.

As shown in FIG. 4, the first conductive plate 131 may be provided as one continuous plate, or may be provided as a plurality of plates isolated from one another. For example, the first conductive plate 131 may include the first conductive plate 131 connected to first electrodes (+) of the battery cells 110 in a first group G1, and another first conductive plate 131 connected to second electrodes (−) of the battery cells 110 in a second group G2. In addition, a second electrode (−) of the battery cell 110 in the first group G1 and a first electrode (+) of the battery cell 110 in the second group G2 are connected to each other via one second conductive plate 132, and, thus, the battery cell 110 in the first group G1 and the battery cell 110 in the second group G2 may be connected to each other in series.

Similarly, the second conductive plate 132 may be provided as one continuous plate, or may be provided as a plurality of plates isolated from one another. For example, the second conductive plate 132 may include the second conductive plate 132 connected to first electrodes (+) of the battery cells 110 in the second group G2, and another second conductive plate 132 connected to second electrodes (−) of the battery cells 110 in a third group G3. In addition, a second electrode (−) of the battery cell 110 in the second group G2 and a first electrode (+) of the battery cell 110 in the third group G3 are connected to each other via one first conductive plate 131, and, thus, the battery cell 110 in the second group G2 and the battery cell 110 in the third group G3 may be connected to each other in series.

Although not shown in the drawings, in a configuration in which the plurality of battery cells 110 are connected in parallel, the first and second conductive plates 131 and 132 may be electrically connected to the first electrode (+) and the second electrode (−) of the battery cell 110, and each of the first and second conductive plates 131 and 132 is provided as one plate to form a common first electrode (+) or a common second electrode (−).

Referring to FIG. 2, the first conductive plate 131 and the second conductive plate 132 may be stacked with each other in a vertical direction with respect to each other, and an insulation plate 133 may be interposed between the first and second conductive plates 131 and 132 for electrical insulation thereof.

In an embodiment, with respect to the electric connection between the battery cell 110 and the first and second conductive plates 131 and 132, first and second conductors or conductive wires 141 and 142 are arranged between the battery cell 110 and the first and second conductive plates 131 and 132 to mediate, or form, the electric connection between the battery cell 110 and the first and second conductive plates 131 and 132. While described herein as first and second conductive wires, the first and second conductors are not limited to conductive wires, and may, for example, be first and second conductive tabs. In more detail, the first conductive wire 141 is connected to the first conductive plate 131 to mediate the electric connection between the battery cell 110 and the first conductive plate 131. The second conductive wire 142 is connected to the second conductive plate 132 to mediate the electric connection between the battery cell 110 and the second conductive plate 132.

Each of the first and second conductive wires 141 and 142 includes an end portion coupled to the battery cell 110 and an opposite end portion coupled to the first or second conductive plate 131 or 132, and may mediate the electric connection between the battery cell 110 and the first or second conductive plate 131 or 132. Here, the first and second conductive wires 141 and 142 are coupled to the upper end 110u of the battery cell 110 and may be coupled to the first and second conductive plates 131 and 132 via a thermal junction process, such as a soldering process or a welding process applied to the end portion and the opposite end portion thereof. For example, the first conductive wire 141 may extend from the first electrode 111 provided at the center of the upper end 110u of the battery cell 110 to be connected to the first conductive plate 131, and the second conductive wire 142 may extend from the second electrode 112 provided at the circumference of the upper end 110u of the battery cell 110 to be connected to the second conductive plate 132.

The first and second conductive plates 131 and 132 may respectively include a first connection hole 131h and a second connection hole 132h, through which the first and second conductive wires 141 and 142 extending from the upper end 110u of the battery cell 110 may penetrate. Also, the insulation plate 133 between the first and second conductive plates 131 and 132 may include a third connection hole 133h for passing the first and second conductive wires 141 and 142.

The first and second conductive wires 141 and 142 may penetrate through the first to third connection holes 131h, 132h, and 133h to be coupled to the first and second conductive plates 131 and 132. The first to third connection holes 131h, 132h, and 133h may be provided at a location corresponding to the opening 122h of the second holder 122 that exposes the upper end 110u of the battery cell 110.

The first and second conductive plates 131 and 132 may be arranged to overlap with each other as the insulation plate 133 is interposed therebetween. For example, the first conductive plate 131 may be located at a lower position and the second conductive plate 132 may be located at an upper position relative to each other.

In an embodiment, for example, the first conductive wire 141 extends from the first electrode 111 provided at the center of the battery cell 110, and then may be coupled to the first conductive plate 131 after penetrating sequentially through the opening 122h of the second holder 122 and the first connection hole 131h of the first conductive plate 131. In an embodiment, the first conductive plate 131 may include a first coupling portion 131a for accommodating the first conductive wire 141 and coupling to the first conductive wire 141. For example, the first coupling portion 131a may be provided at a location contacting the first connection hole 131h of the first conductive plate 131, and may be stepped downwards from a main plane or main surface (e.g., an upper plane or upper surface) of the first conductive plate 131 toward the battery cell 110. The first coupling portion 131a may be provided at a location contacting the first connection hole 131h for coupling to the first conductive wire 141 that extends after penetrating through the first connection hole 131h, and is stepped downwards from the main plane of the first conductive plate 131 toward the battery cell 110. Thus, a bonding portion between the first coupling portion 131a and the first conductive wire 141 may be spaced away from the main plane of the first conductive plate 131, such as not to cause interference with the insulation plate 133 and to be protected by the first conductive plate 131.

In an embodiment, for example, the second conductive wire 142 extends from the second electrode 112 provided at the circumference of the battery cell 110 and may be coupled to the second conductive plate 132 after penetrating sequentially through the opening 122h of the second holder 122, the first connection hole 131h of the first conductive plate 131, the third connection hole 133h of the insulation plate 133, and the second connection hole 132h of the second conductive plate 132. In an embodiment, the second conductive plate 132 may include a second coupling portion 132a for accommodating the second conductive wire 142 and coupling to the second conductive wire 142. In an embodiment, for example, the second coupling portion 132a may be provided at a location contacting the second connection hole 132h of the second conductive plate 132, and may be stepped downwards from a main plane or main surface (e.g., an upper plane or upper surface) of the second conductive plate 132 toward the battery cell 110. The second coupling portion 132a may be provided at a location contacting the second connection hole 132h for coupling to the second conductive wire 142 that extends after penetrating through the second connection hole 132h, and is stepped downwards from the main plane of the second conductive plate 132 toward the battery cell 110. Thus, a bonding portion between the second coupling portion 132a and the second conductive wire 142 may be spaced away from the main plane of the second conductive plate 132, such as not to cause interference with the cover 150 and to be protected by the second conductive plate 132.

Figure 5:
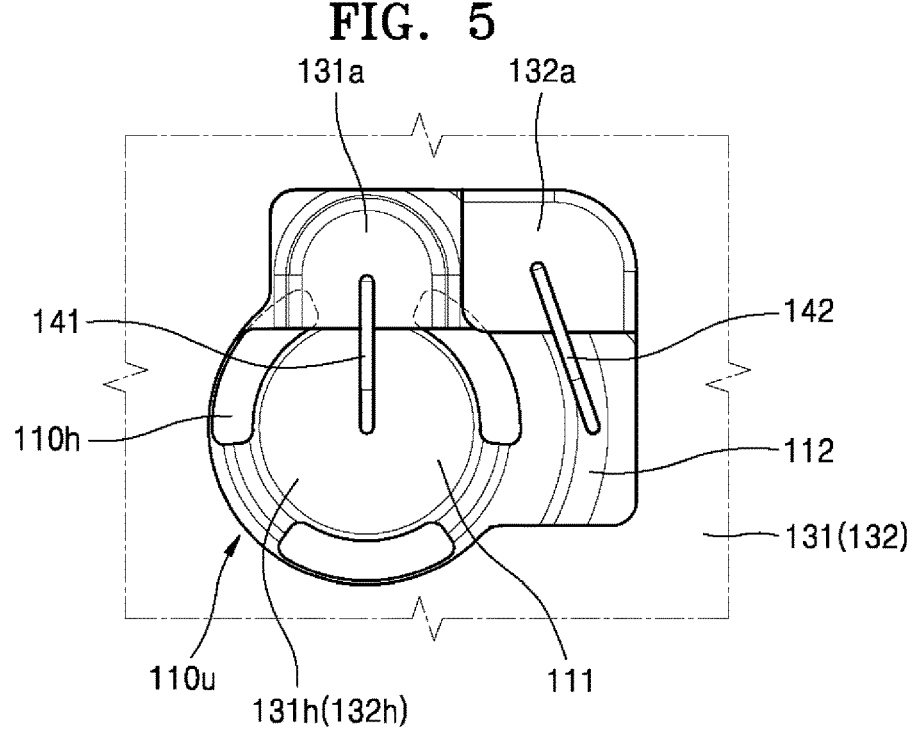
FIG. 5 is a top view of a first coupling portion and a second coupling portion of a first conductive plate and a second conductive plate.

FIG. 5 shows the first and second coupling portions 131a and 132a of the first and second conductive plates 131 and 132, seen from an upper portion.

Referring to FIG. 5, the first and second coupling portions 131a and 132a are respectively provided at the locations contacting the first and second connection holes 131h and 132h, and may not overlap with each other along boundaries of the first and second connection holes 131h and 132h. Since the first and second conductive wires 141 and 142 of different polarities are respectively coupled to the first and second coupling portions 131a and 132a, the first and second coupling portions 131a and 132a may be provided not to overlap with each other in order to prevent or substantially prevent an electrical short circuit between different polarities. However, since the first and second coupling portions 131a and 132a are provided on different plates, that is, the first and second conductive plates 131 and 132, they may be arranged at neighboring locations not overlapping with each other, or may be arranged at neighboring locations along circumferences of the first and second connection holes 131*h* and 132*h*.

The first and second coupling portions 131*a* and 132*a* are provided at locations contacting or adjacent to the first and second connection holes 131*h* and 132*h*, and may be provided outside of the cell vent 110*h* along the circumferences of the first and second connection holes 131*h* and 132*h*. The cell vent 110*h* is provided at the upper end 110*u* of the battery cell 110 in order to reduce a high internal pressure accumulated in the battery cell 110, and is designed to have a lower strength than that of the other portions of the battery cell 110. The cell vent 110*h* may be broken due to a high internal pressure that is higher than a set value, to reduce the internal pressure. The first and second coupling portions 131*a* and 132*a* are portions to which the first and second conductive wires 141 and 142 are connected. In addition, in order to protect the bonding portions of the first and second conductive wires 141 and 142 connected to the first and second coupling portions 131*a* and 132*a* from the flame and gas of high temperature and high pressure discharged from the cell vent 110*h*, and to prevent or substantially prevent an electrical short circuit that may be caused when the first and second conductive wires 141 and 142 released from the coupling to the first and second coupling portions 131*a* and 132*a* due to the flame and gas of the high temperature and high pressure discharged from the cell vent 110*h* are moved in an uncontrolled direction, the first and second coupling portions 131*a* and 132*a* may be provided outside of the cell vent 110*h* along the circumferences of the first and second connection holes 131*h* and 132*h*. In an embodiment, for example, the cell vent 110*h* may be provided as a plurality of cell vents 110*h* at intermittently spaced locations along the outer circumference of the first electrode 111 provided at the center of the upper end 110*u* of the battery cell 110, and the first coupling portion 131*a* may be provided at a location that does not face the cell vents 110*h*, that is, a region between the plurality of cell vents 110*h*. For example, the plurality of cell vents 110*h* may be arranged on the circumference surrounding the first electrode 111 of the battery cell 110, and the first coupling portion 131*a* may face the region between the cell vents 110*h*. The first coupling portion 131*a* is provided in the first conductive plate 131 that is positioned relatively low, and may be provided to face the region between the cell vents 110*h* in order to protect the first coupling portion 131*a* that is relatively closer to the cell vent 110*h*.

As shown in FIG. 2, the cover 150 may be arranged on the connection plate 130. The cover 150 covers the connection plate 130 to protect the connection plate 130 and the bonding portion between the connection plate 130 and the battery cell 110 against an external environment, and may insulate the connection plate 130 from the external environment. The connection plate 130 is provided to electrically connect the plurality of battery cells 110 included in the battery pack, and the cover 150 protects and insulates the bonding portion between the connection plate 130 and the battery cell 110 against the external environment to prevent or substantially prevent an incorrect operation, such as a short circuit of the battery pack.

Figure 6:
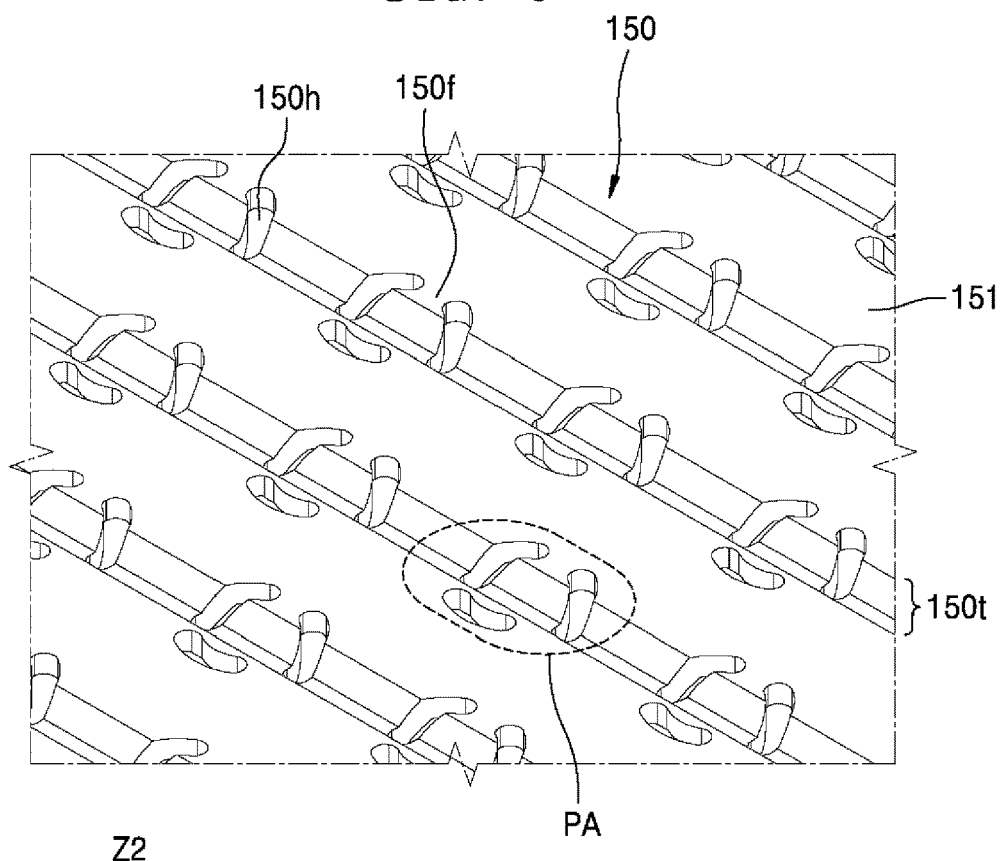
FIGS. 6 and 7 are, respectively, a perspective view and a plan view of a cover of FIG. 1 seen from an upper portion.
Figure 7:
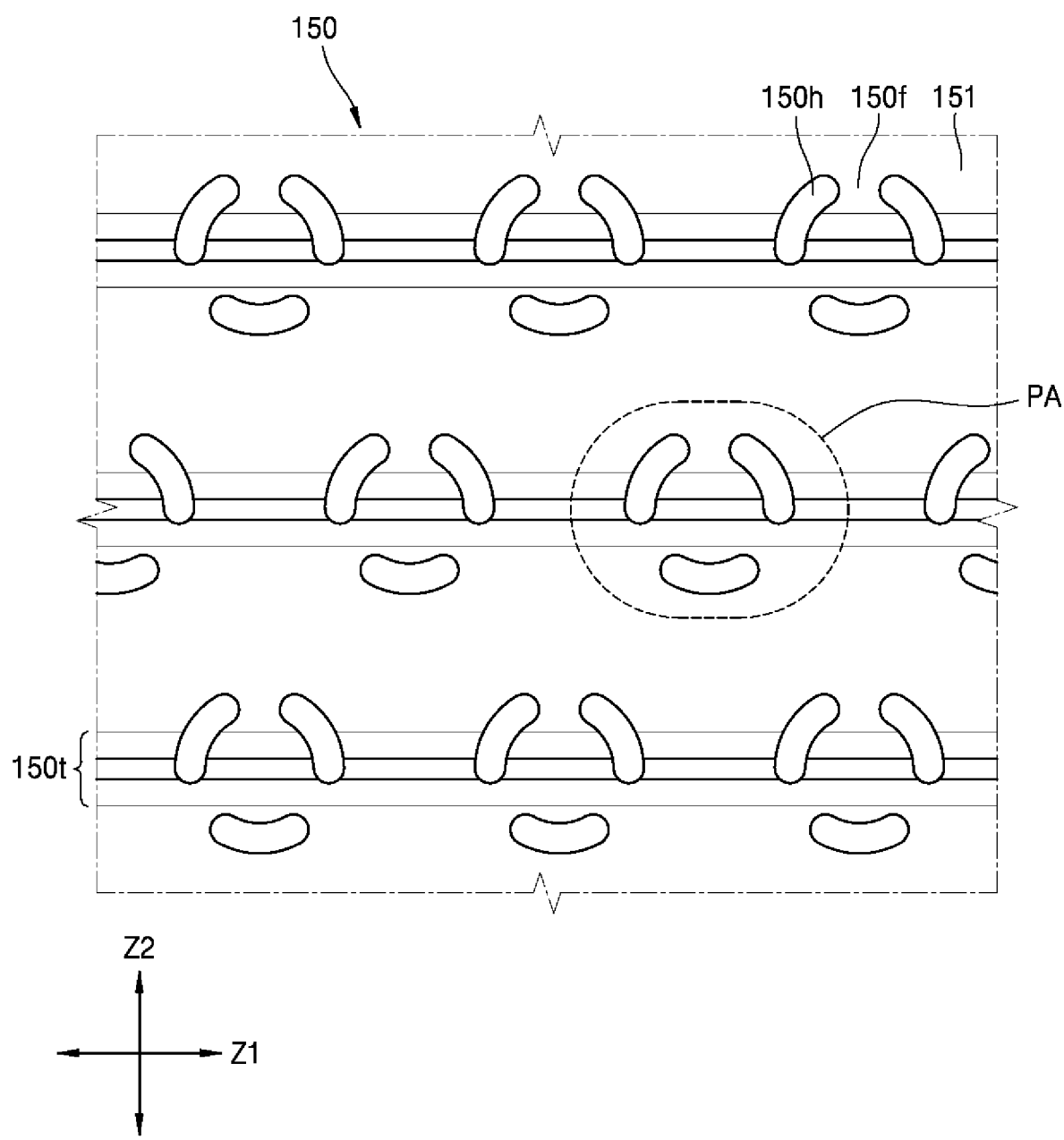
Figure 8:
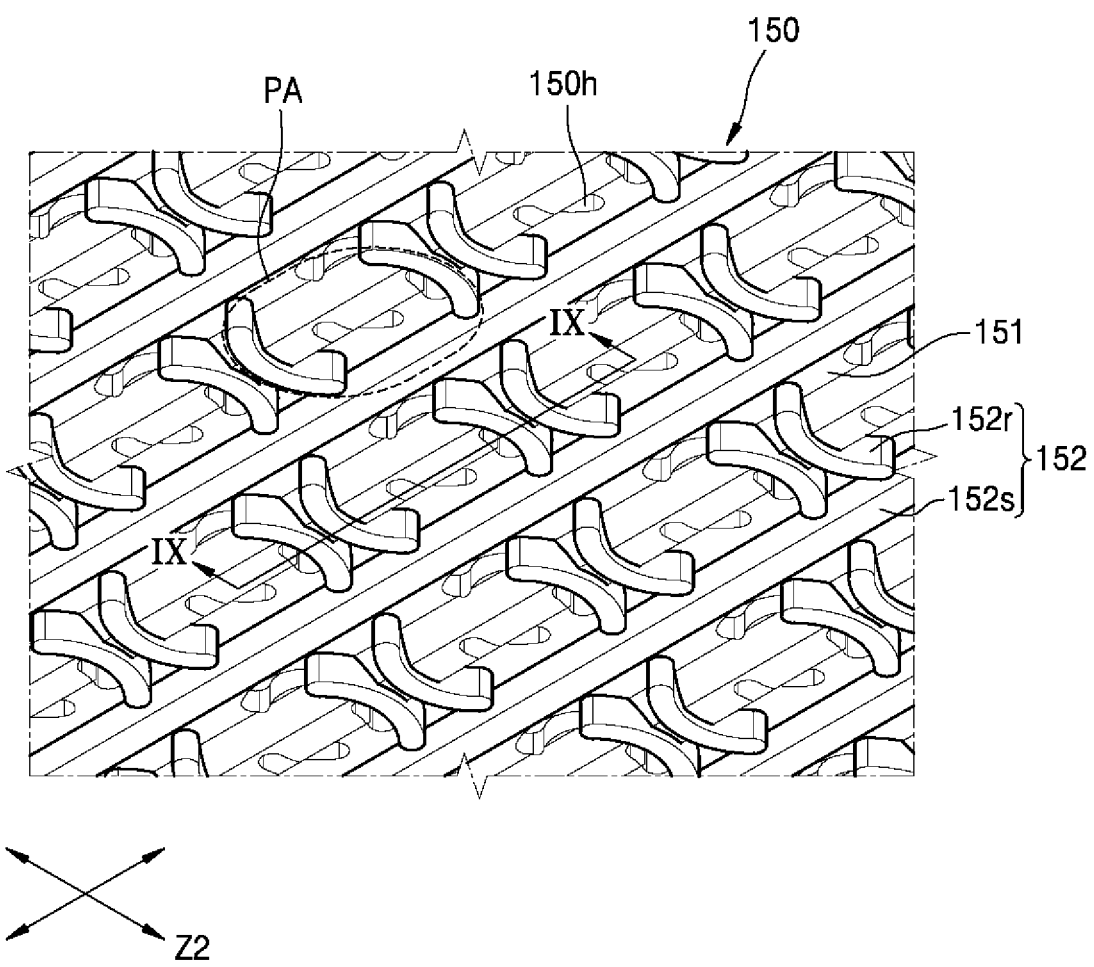
FIG. 8 is a perspective view of the cover of FIG. 1 seen from a lower portion.
Figure 9:
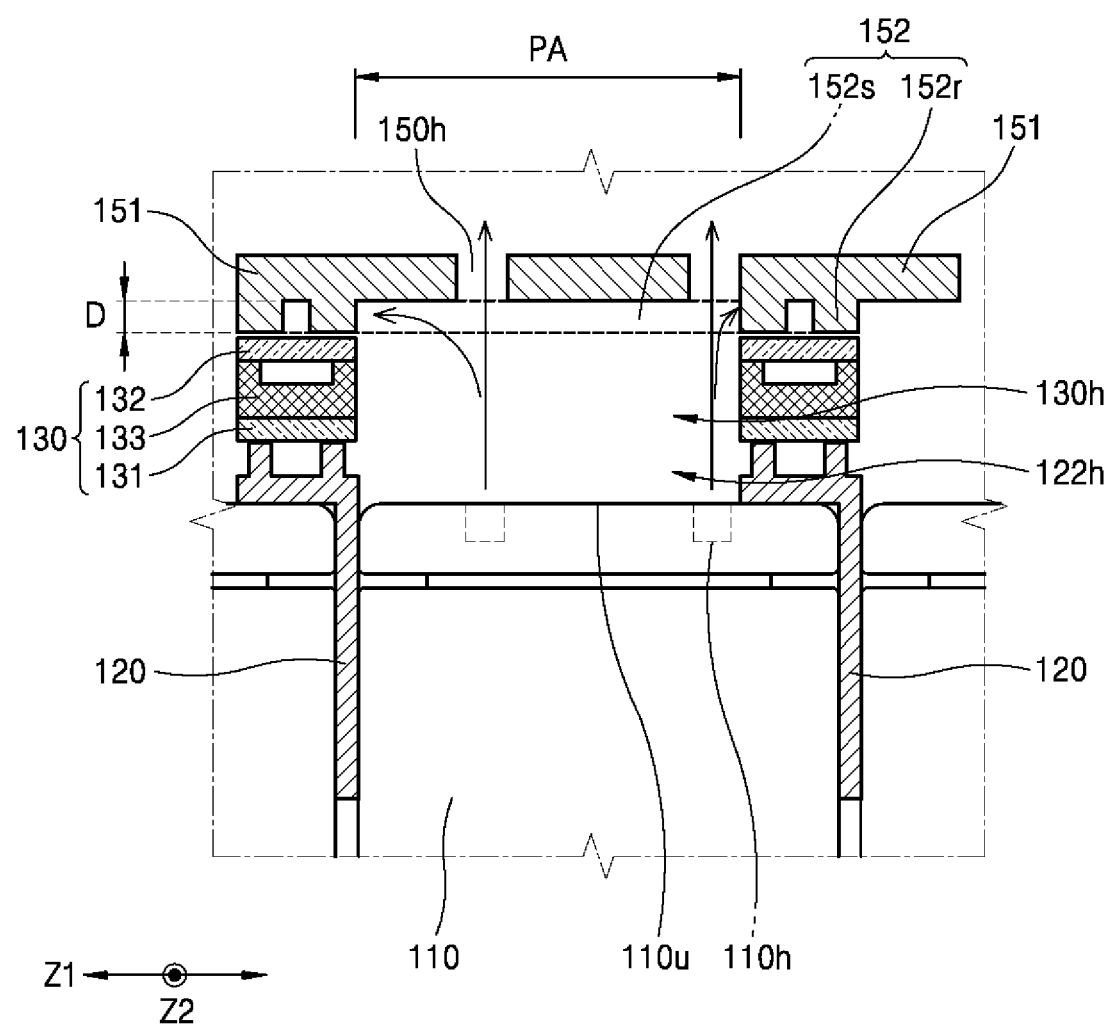
FIG. 9 is a cross-sectional view of the cover taken along a line IX-IX of FIG. 8.
Figure 10:
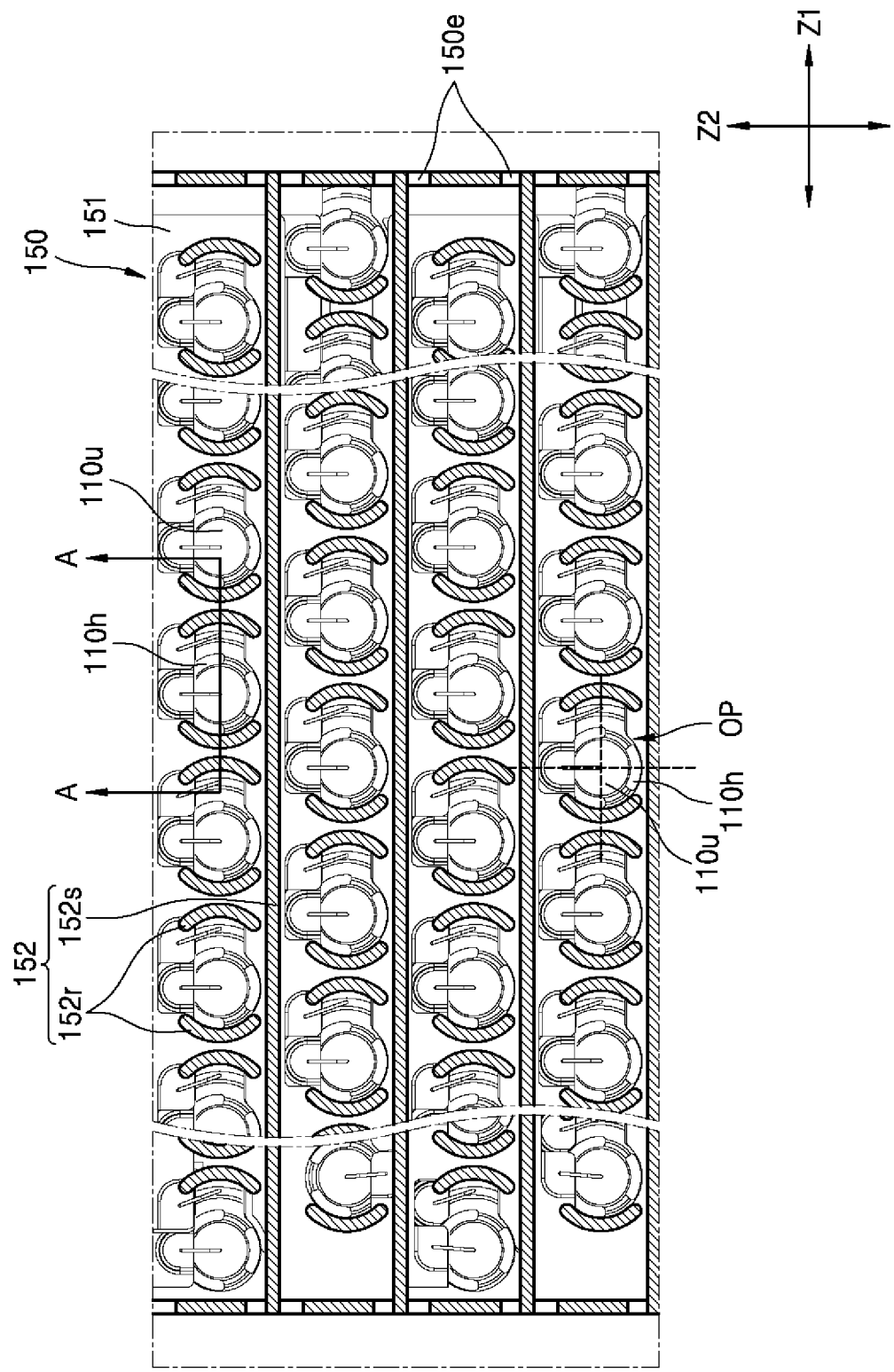
FIG. 10 is a view of a barrier wall in the cover seen from an upper portion.
Figure 11:
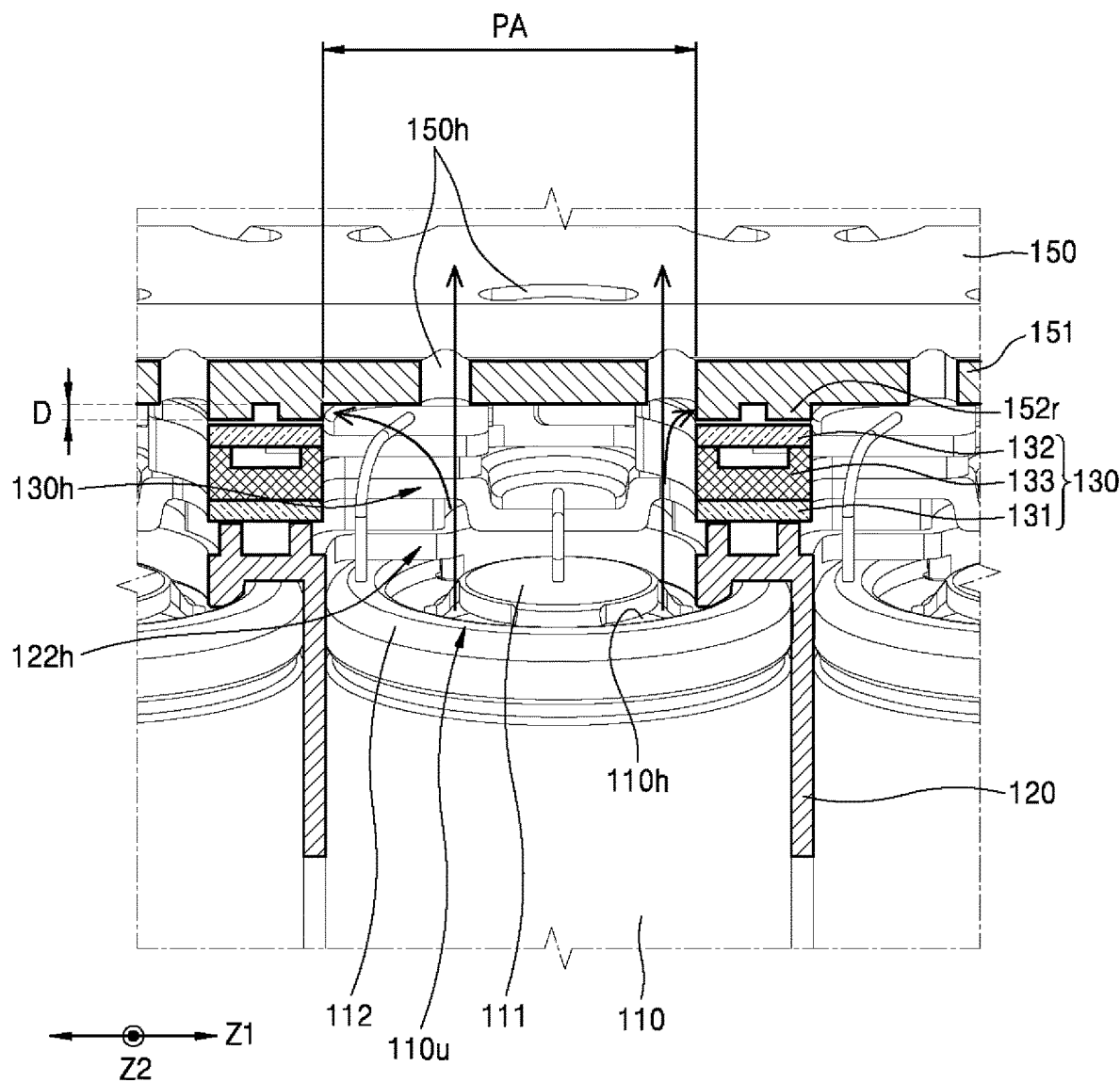
FIG. 11 is a cross-sectional view of the barrier wall of the cover, taken along a line A-A of FIG. 10.

FIGS. 6 and 7 are, respectively, a perspective view and a plan view of the cover 150 shown in FIG. 1, wherein the cover 150 is seen from an upper portion thereof. FIG. 8 is a perspective view of the cover 150 of FIG. 1 seen from a lower portion. FIG. 9 is a cross-sectional view of the cover 150 taken along a line IX-IX of FIG. 8. FIG. 10 is a view illustrating a barrier wall 152 of the cover 150, wherein the barrier wall 152 of the cover 150 is seen from an upper portion thereof. FIG. 11 is a cross-sectional view of the barrier wall 152 of the cover 150, taken along a line A-A of FIG. 10.

Referring to FIGS. 8 and 9, the cover 150 may include a cover plate 151 arranged on the connection plate 130, and the barrier wall 152 extending from the cover plate 151 towards the connection plate 130. The barrier wall 152 may include a round portion 152*r* provided to surround (e.g., at least partially surround) the upper end 110*u* of the battery cell 110, in particular, the cell vent 110*h*, and a stripe portion 152*s* extending in a direction (e.g., a Z1 direction) so as not to cross the round portion 152*r*. The round portion 152*r* and the stripe portion 152*s* may extend from the cover plate 151 to a depth D (see FIG. 9) abutting on the connection plate 130. However, taking into account a processing tolerance, the round portion 152*r* and the stripe portion 152*s* may extend to the depth D (see FIG. 9) at which the round portion 152*r* and the stripe portion 152*s* abut on an upper surface of the connection plate 130, or to the depth D (see FIG. 9) at which the round portion 152*r* and the stripe portion 152*s* are adjacent to the upper surface of the connection plate 130 to have a minimum tolerance. When the round portion 152*r* and the stripe portion 152*s* extend from the cover plate 151 to the depth D (see FIG. 9) where the round portion 152*r* and the stripe portion 152*s* abut on the connection plate 130, it may be prevented or substantially prevented that flame and gas discharged from the cell vent 110*h* are spread to an arbitrary direction, without being discharged to a predetermined controlled direction, between the cover plate 151 and the connection plate 130. That is, the round portion 152*r* and the stripe portion 152*s* may be provided at the same level as each other between the cover plate 151 and the connection plate 130.

Referring to FIGS. 10 and 11, the barrier wall 152 may include at least two round portions 152*r* between two neighboring battery cells 110 to individually surround (e.g., at least partially surround) the cell vent 110*h* of each battery cell 110, and the stripe portion 152*s* extending in a direction (e.g., the Z1 direction) that does not cross the round portions 152*r*.

The round portions 152*r* of the barrier wall 152 are provided to individually surround the cell vent 110*h* of each battery cell 110, and, accordingly, two or more round portions 152*r* may be provided between the neighboring battery cells 110. In one embodiment of the present disclosure, the round portions 152*r* of the barrier wall 152 may be provided as a pair to face the cell vent 110*h* of each battery cell 110, and, accordingly, two round portions 152*r* may be provided between the neighboring battery cells 110.

The round portions 152*r* of the barrier wall 152 may be provided to individually surround the cell vent 110*h* of each battery cell 110. That the round portion 152*r* individually surrounds each cell vent 110*h* may denote the round portion 152*r* is concave toward each cell vent 110*h*. For example, the round portion 152*r* may be provided as a plurality of the round portions 152*r* that are concave towards each of the cell vents 110*h*. A pair of round portions 152*r* that are concave towards the cell vent 110*h* may be aligned for each cell vent 110*h*, and an opening OP may be provided between the pair of round portions 152*r*. The flame and gas discharged through the cell vent 110*h* of the battery cell 110 may not spread to neighboring battery cells 110 according to a guide of the round portions 152*r* surrounding the cell vent 110*h*, and may be discharged through the opening OP provided between the pair of round portions 152r surrounding the cell vent 110h. If the flame and gas of high temperature and high pressure discharged from the cell vents 110h of one battery cell 110 are spread to neighboring battery cells 110, thermal runaway may occur, wherein the thermal runaway may cause overheating or explosion of the neighboring battery cells 110. Thus, according to the present disclosure, the round portions 152r are provided to individually surround each of the cell vents 110h, and, thus, the flame and gas discharged from one cell vent 110h may not successively cause the overheating or explosion of the neighboring battery cells 110.

Throughout the present specification, that the round portion 152r is provided to surround the cell vent 110h, as shown in FIG. 10, denotes that each round portion 152r individually surrounds each cell vent 110h when seen from the upper portion of the cover 150, and, as shown in FIG. 11, the round portion 152r surrounds an upper area of the cell vent 110h and, in an embodiment, the upper area directly above the cell vent 110h, to guide the flame and the gas discharged upwards from the cell vent 110h, when seen from a side of the cover 150. Since the cell vent 110h is provided at the upper end 110u of the battery cell 110, and the cover 150 including the round portion 152r is provided on an upper portion of the battery cell 110 in order to cover the upper end 110u of the battery cell 110, it may be understood that the round portion 152r surrounds the upper area of the cell vent 110h, rather than directly surrounds the cell vent 110h.

The round portion 152r is provided to prevent or substantially prevent the spread of the flame and gas discharged from the cell vent 110h of one battery cell 110 to other neighboring battery cells 110, and the round portion 152r may protrude downward from the cover plate 151 towards the battery cell 110. In more detail, the round portion 152r may extend from the cover plate 151 to the upper surface of the connection plate 130, and may protrude to a depth D (see FIG. 11) where the round portion 152r may abut on the connection plate 130. For example, the round portion 152r may extend from the cover plate 151 to abut on the upper surface of the connection plate 130, or the round portion 152r may extend from the cover plate 151 to the depth D (see FIG. 11) which is adjacent to the upper surface of the connection plate 130 to have a minimum tolerance.

The flame and gas discharged from the cell vent 110h of one battery cell 110 may penetrate through the opening 122h of the cell holder 120 and the first to third connection holes 131h to 133h of the connection plate 130, and may otherwise spread to other neighboring cells 110 through a portion between the cover plate 151 and the connection plate 130. However, in the present disclosure, the round portion 152r is provided between the cover plate 151 and the connection plate 130, and, thus, the flame and gas may not spread to other neighboring battery cells 110 due to the round portion 152r, but may be discharged through the opening OP (see FIG. 10) between the pair of round portions 152r according to the guide of the round portions 152r. For example, the flame and gas discharged from the cell vent 110h of one battery cell 110 is restrained from spreading to other neighboring battery cells 110 by the round portion 152r that surrounds the corresponding cell vent 110h, and is restrained from being discharged to the upper direction by the cover plate 151 provided on the upper portion of the cell vent 110h. Thus, the flame and gas may be discharged through the opening OP (see FIG. 10) between the pair of round portions 152r that surrounds the corresponding cell vent 110h between the cover plate 151 and the connection plate 130 (see FIG. 11). As described above, the flame and gas discharged through the opening OP (see FIG. 10) between the pair of round portions 152r that surrounds the corresponding cell vent 110h may be guided by the stripe portions 152s provided on the cover plate 151 to be discharged outside of the battery pack.

The barrier wall 152 may include the round portion 152r provided to surround each cell vent 110h, and the stripe portion 152s extending in a direction (e.g., the Z1 direction) not to cross the round portion 152r. The stripe portion 152s may guide the flame and gas discharged through the opening OP (see FIG. 10) between the round portions 152r, to an outside of the battery pack.

Referring to FIG. 10, the stripe portion 152s may be arranged to face the opening OP between the round portions 152r, and an exhaust hole 150e may be provided at an end portion of the cover 150 in the direction (e.g., the Z1 direction) in which the stripe portion 152s extends.

Regarding the arrangement of the round portion 152r and the stripe portion 152s, a pair of round portions 152r may be arranged facing each other in order to individually surround each of the cell vents 110h, and the stripe portion 152s may be arranged at a location not facing the round portions 152r, that is, facing the opening OP between the pair of round portions 152r. The stripe portion 152s may not be individually arranged to correspond to each cell vent 110h, but a pair of stripe portions 152s may extend along the direction (e.g., the Z1 direction) at opposite sides of a column of the cell vents 110h. That is, in an embodiment, the stripe portion 152s extends across the cover plate 151 along the direction (e.g., the Z1 direction), and is not provided to individually correspond to each cell vent 110h. For example, the pair of stripe portions 152s arranged at the opposite sides of the column in which the cell vents 110h are arranged may guide the flame and gas discharged from one cell vent 110h in a direction (e.g., the Z1 direction), and may discharge the flame and gas to an outside via the exhaust hole 150e provided at the end of the cover 150 in the direction (e.g., the Z1 direction).

The exhaust hole 150e may be provided at the end of the cover 150 in the direction (e.g., the Z1 direction) in which the pair of stripe portions 152s extends at the opposite sides of the column in which the cell vents 110h are arranged. For example, the exhaust hole 150e may be provided at an end portion (e.g., in the Z1 direction) and an opposite end portion (e.g., in the Z1 direction), where the stripe portions 152s extending at the opposite sides of the column of the cell vents 110h end, and may be open to an outside of the cover 150 at the end portions where the stripe portions 152s end, such that the pair of stripe portions 152s provided in the cover 150 may communicate with the outside of the cover 150. In an embodiment, the exhaust hole 150e may be provided at each of the end portion (e.g., in the Z1 direction) and the opposite end portion (e.g., in the Z1 direction), where the stripe portions 152s end, and may be provided as a plurality of exhaust holes 150e spaced apart from one another along the end portion of the cover 150.

As denoted by dashed lines of a cross shape at a lower portion of FIG. 10, when the pair of round portions 152r surrounding (e.g., at least partially surrounding) the upper end 110u (e.g., the cell vent 110h) of the corresponding battery cell 110 are arranged facing each other along a first axis (Z1), the pair of stripe portions 152s may be arranged facing each other along a second axis (Z2) that is perpendicular to the first axis (Z1). In an embodiment, the first axis Z1 in which the round portions 152r face each other and the second axis Z2 in which the stripe portions 152s face each other are perpendicular to each other, and, thus, the flame and gas discharged from the cell vent 110*h* may be blocked by the round portions 152*r* and restricted from spreading to other adjacent battery cells 110, and then may be rapidly discharged to the outside according to the guide of the stripe portions 152*s*. For example, the first axis Z1 is a blocking direction of the flame and gas discharged from the cell vent 110*h*, and the second axis Z2 may be a discharging direction, in which the flame and gas discharged from the cell vent 110*h* may be discharged through the opening OP.

As shown in FIG. 9, the round portion 152*r* and the stripe portion 152*s* may be provided at the same level as each other between the cover plate 151 and the connection plate 130. The round portion 152*r* and the stripe portion 152*s* may extend from the cover plate 151 to a depth D abutting on the connection plate 130. However, taking into account a processing tolerance, the round portion 152*r* and the stripe portion 152*s* may extend to the depth D at which the round portion 152*r* and the stripe portion 152*s* abut on an upper surface of the connection plate 130, or to the depth D at which the round portion 152*r* and the stripe portion 152*s* are adjacent to the upper surface of the connection plate 130 to have a minimum tolerance.

When the round portion 152*r* and the stripe portion 152*s* extend from the cover plate 151 to the depth D where the round portion 152*r* and the stripe portion 152*s* abut on the connection plate 130, it may be prevented or substantially prevented that the flame and gas discharged from the cell vent 110*h* are spread to an arbitrary direction, without being discharged to a predetermined controlled direction, between the cover plate 151 and the connection plate 130. Referring to FIG. 9, the flame and gas discharged from any one of the cell vents 110*h* may not spread to other neighboring battery cells 110 due to the round portions 152*r* provided between the connection plate 130 and the cover plate 151 after penetrating through the opening 122*h* of the cell holder 120 and the connection holes 130*h* of the connection plate 130, and as shown in FIG. 10, the flame and gas may be exhausted through the opening OP between the pair of round portions 152*r* surrounding the corresponding cell vent 110*h* and may be discharged to the outer portion of the cover 150 via the exhaust hole 150*e* provided at the end portion of the cover 150 according to the guide of the stripe portion 152*s* that is arranged facing the opening OP between the pair of round portions 152*r*.

Referring to FIGS. 6 to 9, a vent hole 150*h* may be formed in a projection area PA of the cover plate 151, wherein the projection area PA is surrounded (e.g., at least partially surrounded) by the round portions 152*r*. For example, a plurality of vent holes 150*h* may be arranged in a circumferential direction in the projection area PA of the cover plate 151, wherein the projection area PA is surrounded by the round portions 152*r*, and a fracture portion 150*f* may be provided among the plurality of vent holes 150*h*.

Since the round portions 152*r* surround the cell vent 110*h*, the pressure or temperature of the flame and gas discharged from the cell vent 110*h* may be concentrated in the projection area PA of the cover plate 151, which is surrounded by the round portions 152*r*. Here, by arranging additional vent holes 150*h* in the cover plate 151, the flame and gas of high pressure may be rapidly discharged to the outer portion of the cover 150 via the vent hole 150*h* of the cover plate 151, and an accident such as an explosion may be prevented or substantially prevented.

In an embodiment, for example, the vent holes 150*h* are arranged in a circumferential direction in the projection area PA of the cover plate 151, wherein the projection area PA is surrounded by the round portions 152*r*, to be spaced apart at intervals (e.g., predetermined intervals) from one another, and each of the vent holes 150*h* may be formed as an arc along the circumferential shape.

Referring to FIG. 9, the vent hole 150*h* may be provided in the cover plate 151 arranged on the plurality of cell vents 110*h*, and may contribute to the rapid discharge of the flame and gas discharged from the cell vent 110*h* to the outside, in cooperation with the barrier wall 152 protruding from the cover plate 151, that is, the round portion 152*r* and the stripe portion 152*s* of the barrier wall 152.

For example, the round portion 152*r* protruding from the cover plate 151 prevents or substantially prevents the flame and gas discharged from the cell vent 110*h* of one battery cell 110 from spreading to other neighboring battery cells 110, and the flame and gas may be discharged to the outer portion of the cover 150 through the opening OP (see FIG. 10) between the pair of round portions 152*r* surrounding the corresponding cell vent 110*h*, a channel between the pair of stripe portions 152*s* facing the opening OP between the pair of round portions 152*r*, and the opening 150*e* (see FIG. 10) at the end of the cover 150, or may be directly discharged to the outer portion of the cover 150 through the vent hole 150*h* (see FIG. 9) provided in the cover plate 151. The exhaust path of the flame and gas discharged from the cell vent 110*h* may vary depending on the state of the flame and gas discharged from the cell vent 110*h*, and, as will be described later, the present disclosure may provide the exhaust path that adaptively varies depending on the temperature or the pressure of the flame and gas discharged from the cell vent 110*h*.

Referring to FIGS. 6 and 7, the plurality of vent holes 150*h* may be spaced apart by a distance (e.g., a predetermined distance) from one another, and the fracture portion 150*f* may be provided among the vent holes 150*h*. The fracture portion 150*f* may be fusion cut to make the flame and gas of high temperature and high pressure rapidly discharged to the outside, such as when the pressure of the flame and gas discharged from the cell vent 110*h* is higher than a set value and/or the temperature of the flame and gas discharged from the cell vent 110*h* is higher than a set value. An area through which the flame and gas may be discharged due to the fusion cutting of the fracture portion 150*f* is much greater than an area of the vent hole 150*h* before the fusion cutting, and the flame and gas of high temperature and high pressure may be rapidly discharged through an increased area due to the fusion cutting of the fracture portion 150*f*.

For example, the fracture portion 150*f* corresponds to a region among the plurality of vent holes 150*h* arranged along the circumference, and the fusion cut intensity of the fracture portion 150*f* may be changed according to design specification, such as a material of the cover 150 forming the fracture portion 150*f*, a length of the fracture portion 150*f*, and a thickness of the fracture portion 150*f*.

The fracture portion 150*f* may be fusion cut by the flame and gas of high pressure and high temperature discharged from the cell vent 110*h*, and fusion cutting conditions of the fracture portion 150*f* may be determined according to the material of the cover 150 forming the fracture portion 150*f*. In an embodiment, for example, the cover 150 may include a polymer composite material reinforced by glass fiber, which may maintain a stabilized formation under a high temperature. In an embodiment, for example, the flame and gas may have a temperature of about 200 to about 280° C., and the cover 150 forming the fracture portion 150*f* may be designed to have a melting point of about 260° C. to be fusion cut by the flame and gas of high temperature. For example, since a general polymer material, e.g., polycarbonate (PC), that is not reinforced by the glass fiber generally has a melting point of 200° C. or less, for example, about 180° C., the general polymer material may not be suitable for the cover 150 including the fracture portion 150*f* because of the fusion cutting condition of the fracture portion 150*f*, that is, the fracture portion 150*f* needs to be fusion cut by the flame and gas of relatively high temperature and to maintain stabilized shape with respect to the flame and gas of relatively low temperature.

The fracture portion 150*f* may be provided as the region among the vent holes 150*h* of the cover plate 151, and accompanied with the exhaust of the flame and gas guided by the barrier wall 152 protruding from the cover plate 151, that is, by the round portion 152*r* and the stripe portion 152*s*, or prior to the guidance by the barrier wall 152, the flame and gas may be exhausted through the wide area obtained by the fusion cutting of the fracture portion 150*f*. Here, the exhaust caused by the fusion cutting of the fracture portion 150*f* may be performed when the temperature or the pressure of the flame and gas discharged from the cell vent 110*h* is higher than a set value, and may provide a rapid and direct exhaust path. Thus, the exhaust through the fusion cutting of the fracture portion 150*f* may be performed with priority in a circumstance where there is a concern about a safety accident, such as explosion or ignition of the battery cell 110.

The length of the fracture portion 150*f* may correspond to an interval between the vent holes 150*h* arranged in a circumferential shape, and may be appropriately designed taking into account the fusion cutting condition of the fracture portion 150*f*. In an embodiment, the fracture portion 150*f* may include a thin wall portion 150*t* having a thickness that is relatively smaller than the other regions in the cover plate 151, such that the fusion cutting may be easily performed.

In an embodiment, the thin wall portion 150*t* extends across a column in which the vent holes 150*h* are arranged, and may be provided as a valley that is concavely introduced in the thickness direction of the cover plate 151 in order to have a thickness that is relatively small. The thin wall portion 150*t* may be provided along a direction (e.g., the Z1 direction) crossing the cover plate 151 along with the column of the vent holes 150*h*. In addition, since the fracture portion 150*f* may have a small thickness due to the thin wall portion 150*t* that crosses the fracture portion 150*f*, the fusion cutting of the fracture portion 150*f* may be performed easily, and a fusion cutting point may be clearly defined and the fracture portion 150*f* may be fusion cut prior to any other regions in the cover plate 151.

According to embodiments of the present disclosure, a battery pack including a plurality of battery cells may be capable of preventing or substantially preventing successive thermal runaways caused when flame and gas of high temperature and high pressure discharged from one battery cell are diffused to other battery cells according to a vent operation, and may be capable of safely and rapidly discharging the flame and gas of high temperature and high pressure along a designated exhaust path.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
  a plurality of battery cells, each comprising at least one cell vent;
  a connection plate extending over the plurality of battery cells and electrically connected to the plurality of battery cells; and
  a cover comprising a cover plate arranged over the connection plate and a barrier wall protruding from the cover plate towards the connection plate,
  wherein the barrier wall includes at least two round portions extending between two neighboring battery cells of the plurality of battery cells that are spaced apart along a first direction to individually at least partially surround the at least one cell vent of a battery cell of the two neighboring battery cells, and a stripe portion extending along the first direction across the cover plate from a first side of the cover plate to a second side of the cover plate and spaced from the at least two round portions, wherein the stripe portion extends between another two neighboring battery cells of the plurality of battery cells that are spaced apart along at least a second direction coplanar and perpendicular to the first direction.

2. The battery pack of claim 1, wherein each of the at least two round portions is concave towards the at least one cell vent.

3. The battery pack of claim 1, wherein the at least two round portions of the barrier wall comprise a pair of round portions to at least partially surround the at least one cell vent.

4. The battery pack of claim 3, wherein an opening is located between the pair of round portions.

5. The battery pack of claim 4, wherein the stripe portion faces the opening.

6. The battery pack of claim 1, wherein the stripe portion comprises a pair of stripe portions extending at opposite sides of a column in which battery cells of the plurality of battery cells are arranged.

7. The battery pack of claim 1, wherein the stripe portion extends to an exhaust hole located at an end portion of the cover.

8. The battery pack of claim 7, wherein the exhaust hole comprises a pair of exhaust holes respectively located at an end portion of the stripe portion and an opposite end portion of the stripe portion.

9. The battery pack of claim 1, wherein a pair of round portions from among the at least two round portions of the barrier wall at least partially surrounding each of the at least one cell vent is arranged facing each other in a first axis, and the stripe portion comprises a pair of stripe portions arranged along a second axis that is perpendicular to the first axis.

10. The battery pack of claim 1, wherein a round portion of the at least two round portions and the stripe portion are arranged at a same level in a vertical direction.

11. The battery pack of claim 10, wherein the round portion of the at least two round portions and the stripe portion protrude from the cover plate to a depth abutting on the connection plate.

12. The battery pack of claim 1, wherein a vent hole is located in a region of the cover plate, wherein the region is at least partially surrounded by a pair of round portions from among the at least two round portions of the barrier wall.

13. The battery pack of claim 12, wherein the vent hole comprises a plurality of vent holes arranged along a circumference of the pair of round portions.

14. The battery pack of claim 13, wherein a fracture portion is located between the plurality of vent holes.

15. A battery pack comprising:
a plurality of battery cells, each comprising at least one cell vent;
a connection plate extending over the plurality of battery cells and electrically connected to the plurality of battery cells; and
a cover comprising a cover plate arranged over the connection plate and a barrier wall protruding from the cover plate towards the connection plate,
wherein the barrier wall includes at least two round portions extending between two neighboring battery cells of the plurality of battery cells to individually at least partially surround the at least one cell vent of a battery cell of the two neighboring battery cells, and a stripe portion extending across the cover plate and spaced from the at least two round portions,
wherein a vent hole is located in a region of the cover plate, wherein the region is at least partially surrounded by a pair of round portions from among the at least two round portions of the barrier wall,
wherein the vent hole comprises a plurality of vent holes arranged along a circumference of the pair of round portions,
wherein a fracture portion is located between the plurality of vent holes, and
wherein the fracture portion comprises a thin wall portion having a thickness that is smaller than a thickness of a remaining region in the cover plate.

16. The battery pack of claim 1, wherein the connection plate comprises: a first conductive plate and a second conductive plate configured to be electrically connected to the battery cells, the first conductive plate and the second conductive plate being stacked with each other in a vertical direction; and an insulation plate between the first conductive plate and the second conductive plate.

17. The battery pack of claim 16, further comprising a first conductor and a second conductor configured to electrically connect a battery cell of the plurality of battery cells to the first conductive plate and the second conductive plate, respectively,
wherein the first conductor is configured to extend from an upper end of the battery cell and to be connected to a first coupling portion of the first conductive plate after penetrating through a first connection hole provided in the first conductive plate, and
the second conductor is configured to extend from the upper end of the battery cell and to be connected to a second coupling portion of the second conductive plate after penetrating through each of the first connection hole in the first conductive plate, a second connection hole in the second conductive plate, and a third connection hole in the insulation plate.

18. The battery pack of claim 17, wherein the first coupling portion connected to the first conductor is adjacent to the first connection hole of the first conductive plate and stepped downward from a main surface of the first conductive plate, and
the second coupling portion connected to the second conductor is adjacent to the second connection hole of the second conductive plate and stepped downward from a main surface of the second conductive plate.

19. The battery pack of claim 17, wherein the first coupling portion is at a location not facing the at least one cell vent along a circumference of the first connection hole in the first conductive plate.

20. The battery pack of claim 19, wherein the at least one cell vent comprises a plurality of cell vents arranged circumferentially to at least partially surround a first electrode of the battery cell, and the first coupling portion faces a region between the plurality of cell vents.

21. The battery pack of claim 17, wherein the first conductor comprises a first conductive wire or tab, and the second conductor comprises a second conductive wire or tab.

22. The battery pack of claim 1, wherein each of the battery cells is cylindrical.

* * * * *